Figure 1:
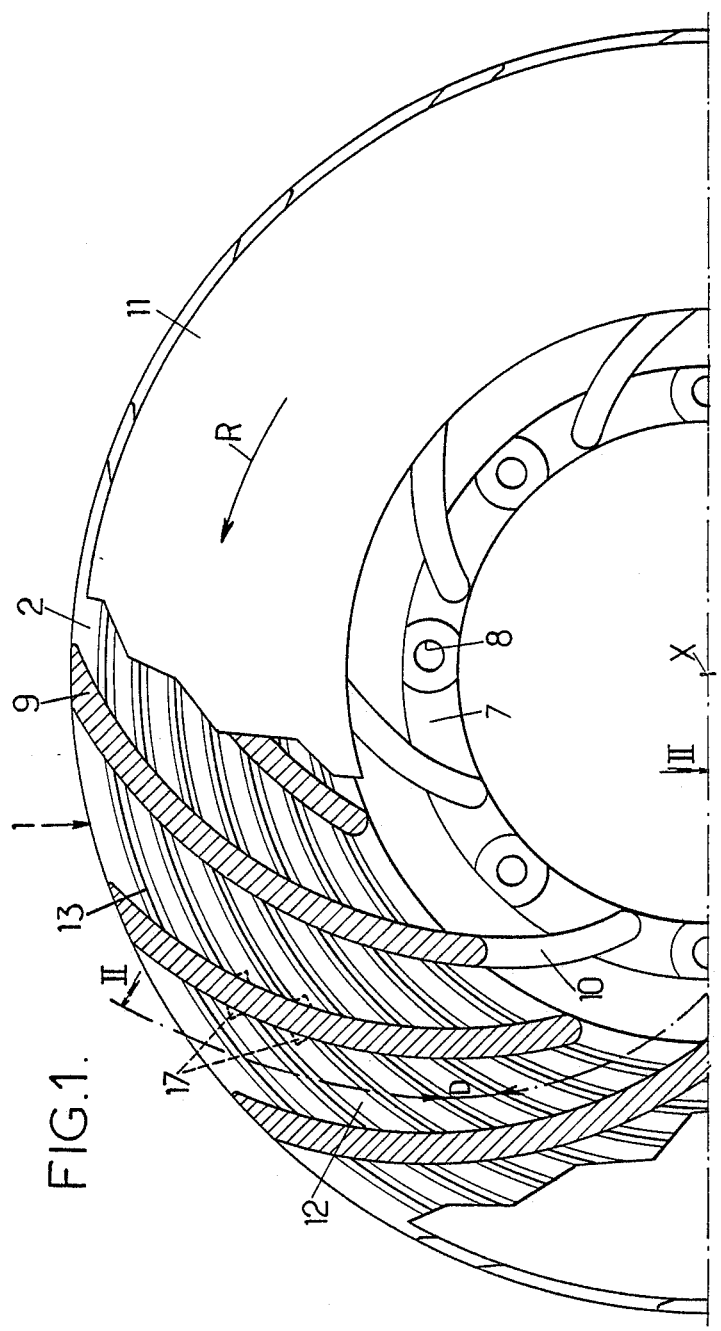

United States Patent [19]

Estaque

[11] Patent Number: 4,811,822

[45] Date of Patent: Mar. 14, 1989

[54] ARMATURE ROTORS OF ELECTROMAGNETIC BRAKES

[75] Inventor: Michel Estaque, Taverny, France

[73] Assignee: Labavia S.G.E., Montigny le Bretonneux, France

[21] Appl. No.: 15,297

[22] Filed: Feb. 17, 1987

[30] Foreign Application Priority Data

Feb. 21, 1986 [FR] France .................. 86 02425

[51] Int. Cl.⁴ .................. B60L 7/28; F16D 65/78
[52] U.S. Cl. .................. 188/264 A; 188/264 AA; 188/218 XL
[58] Field of Search ....... 188/218 R, 264 A, 264 AA, 188/218 XL, 71 G, 264 R; 192/113 R, 113 A

[56] References Cited

U.S. PATENT DOCUMENTS

| | | | |
|---|---|---|---|
| 1,137,939 | 5/1915 | Wern | 188/264 A |
| 2,068,820 | 1/1937 | Sarazin et al. | 188/264 A |
| 2,345,016 | 3/1944 | Tack | 188/264 A |
| 2,473,040 | 6/1949 | Schlegel | 188/264 A |
| 2,656,021 | 10/1953 | Butler | 188/264 A |
| 2,685,659 | 8/1954 | Bessiere | 310/93 |
| 2,728,421 | 12/1955 | Butler | 188/264 A |
| 2,733,361 | 1/1956 | Bessiere | 310/61 |
| 2,818,516 | 12/1957 | Bessiere | 310/93 |
| 2,842,690 | 7/1958 | Bessiere | 310/93 |
| 3,263,783 | 8/1966 | Sutaruk | 192/113 A |
| 3,391,763 | 7/1968 | Severson | 188/264 AA |
| 3,592,298 | 7/1971 | Troy et al. | 188/71.6 |
| 3,732,953 | 5/1973 | Huet | 192/113 A |

FOREIGN PATENT DOCUMENTS

| | | | |
|---|---|---|---|
| 2406133 | 8/1974 | Fed. Rep. of Germany | 188/218 XL |
| 566572 | 3/1945 | United Kingdom . | |
| 2144186 | 2/1985 | United Kingdom | 188/218 XL |

Primary Examiner—Andres Kashnikow
Assistant Examiner—Mark T. Le
Attorney, Agent, or Firm—Larson & Taylor

[57] ABSTRACT

To improve the cooling of the rotor armature disc of an electromagnetic brake, connecting to an external web by a ring of arms forming ventilation fins, the web bounding with the disc and the portions of fins which connect it to this disc, channels for ventilation air, on one at least of the surface bounding the channels internally, striae or ondulations are provided constituted by ribs extending in directions inclined to the direction of flow of the air in the channels. The ratio between the spacing of the sucessive ribs and the height of these ribs is comprised between 5 and 15.

6 Claims, 2 Drawing Sheets

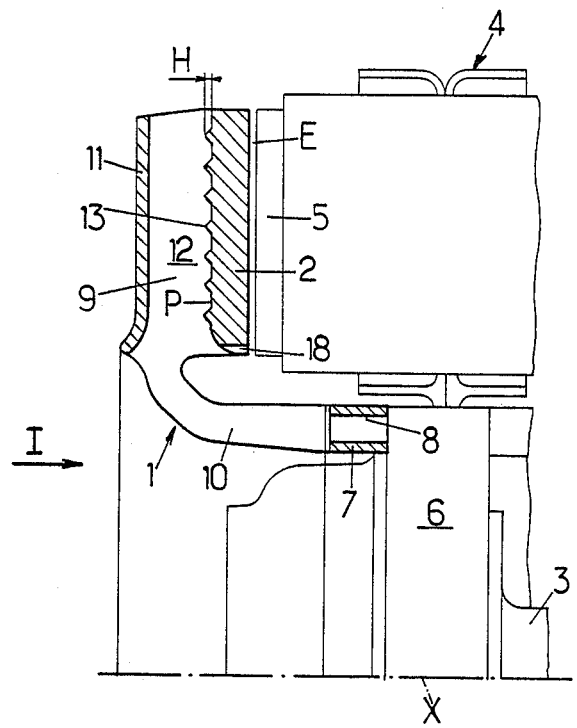
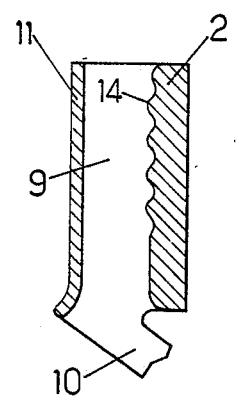
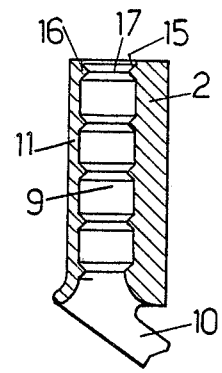

ARMATURE ROTORS OF ELECTROMAGNETIC BRAKES

The invention relates to armature rotors of electromagnetic brakes, particularly for vehicles, said armatures comprising at least one disc of ferromagnetic material adapted to pass before a stator ring of alternatively positive and negative electromagnetic poles from which it is separated only by an air gap, this disc then being braked and heated due to the fact of the creation of eddy currents in the mass.

It is directed more particularly, among these armatures, to those whose disc is connected to an inner fastener ring by a ring of arms inclined to the coresponding radii so as to form ventilation fins, the portions of greatest diameter of these arms projecting axially on the surface of the disc opposite the air gap, and the crests of these portions being joined together by an annular web.

The whole of the disc, of the ring, of the arms and of the web is generally constitued by a single unit molded from steel.

The removal of the calories generated in the disc of such an armature by the eddy currents, during the use of the brake equipped with this armature, is done essentially by conduction to the web through the arms and by radiation and convection from the disc, from the arms and from the web, the latter phenomenon being strongly reinforced by ventilation: in fact the fin profile adopted for the arms causes the armature to play the role of ventilator by sweeping by a cooling flow of air the hot surfaces to be cooled of the disc, of the arms and of the web, which surfaces then define channels for said air flow.

In known embodiments, the surfaces bounding the ventilation channels internally do not have particular roughnesses and the cooling of the disc leaves something to be desired.

Thus this disc can be brought to red heat, its temperature reaching or even exceeding a value of the order of 700° C., whilst the web remains at a temperature below 500° C.

Now it is important to cool the disc efficiently.

In fact, the braking torque which can be generated by the brake equipped with this disc is reduced to a considerable extent when this disc heats up.

Thus this torque can diminish from a value of C to a value of C/3, for given values of the rotary speed and of the electric power consumed when the disc is heated up from ambiant temperature to a temperature of the order of 700° C.

It is a particular object of the invention, to improve the cooling of the disc in the course of the operation of the brake and hence to increase the value of the hot torque generated by this apparatus without however increasing substantially the torque necessary for the driving of the brake.

Accordingly, armatures of the type concerned according to the invention are essentially characterized in that one at least of the surfaces internally bounding the ventilation channels is striped or by parallel ribs extending in a direction inclined to the direction of circulation of the air in these channels, the angle formed between each rib flank and the portion of cintiguous surface being at the most equal to 90°, and the ratio between the spacing of the successive ribs and the height of these ribs being comprised between 5 and 15.

In preferred embodiments, recourse is had in addition to one and/or other of the following features:
the above ratio is of the order of 10,
the height of each rib is comprised between 2 and 5 mm,
the ribs are provided on the flat surface, of the disc, most remote from the air gap, and are annular and concentric,
the ribs are provided on the fins and extending in the axial direction,
the ribs are provided on the surface, of the web, situated on the side of the disc and are annular and concentric,
the ribs have a perpendicular cross-section in the form of a triangle,
the ribs have in perpendicular cross-section the form of a rectangle,
the ribs have in perpendicular cross-section a substantially sinusoidal shape,
the ribs form a single unit with the surfaces on which they project.

The invention comprises, apart from these main features, certain other features which are preferably used at the same time and which will be more explicitly considered below.

In the following, preferred embodiments of the invention will be described with reference to the accompanying drawings given of course purely as non-limiting.

FIGS. 1 and 2, of these drawings, show an electromagnetic brake armature constructed according to the invention respectively in half-view at the end along the arrow I of FIG. 2 and in axial half-section along the line II—II FIG. 1, the corresponding stator being in addition shown partly in phantom form in FIG. 2.

FIGS. 3 and 4 are modifications also according to the invention of the left upper portion of FIG. 2.

The word "rotor" (armature) used in the present text denotes more precisely each of the one-piece subassemblies 1 which are comprised by the rotor assembly of axis X of an electromagnetic brake or "eddy current" retarder which comprise an armature disc 2 of ferromagnetic material.

As is known, such a disc 2 is made fast with the shaft 3 to be braked, such as the transmission shaft of the vehicle, and it is mounted so as to be able to pass before the stator 4 of the brake, or more precisely before a ring of inductor poles 5 alternatively positive and negative forming a part of this stator, with the interposition of an air gap E, the disc 2 concerned then being the seat of eddy currents which are translated by a braking and a heating up of this disc.

The rotor assembly of the brake comprises, in addition to the rotor or sub-assembly defined above which is single or preferably split symmetrically on each side of the stator, an intermediate part 6 of revolution around the axis X, such as a sleeve, hub or plate, itself fixed, generally by bolting, to the shaft 3 to be braked, each "rotor" 1 concerned here being on its side fixed by bolting to this intermediate part.

As again known in itself, each rotor 1 comprises, in addition to the disc 2, and formed from molding with this disc:
a fastening ring 7 of average diameter less than the inner diameter of the disc 2, pierced by axial bores 8, threaded or not, designed to receive bolts (not shown) for fixing this ring to the intermediate part 6,
a ring of ventilation fins 9 projecting on the surface, of the disc 2, opposite its surface designed to bound the air gap E, certain at least of these fins (particularly one in two or one in three) being extended towards the axis X so as to form arms 10 connecting the disc to the ring 7, and a rim or annular web 11 extending generally parallel with the disc and connecting the crests of the portions of greatest diameter of the fins 9 so as to form between these fins, the disc and the web, guide channels 12 for the ventilation air.

The fins 9 and the arms 10 which extend them possibly are inclined and preferably incurved rearwards with respect to the direction of rotation R of the rotor, if one considers the increasing radii.

The arms 10 are preferably axially bent, as in the embodiment illustrated in FIG. 2, so as to "bring back" axially the ring 7 towards the inside of the stator and thus to reduce the axial bulk of the central portion of the rotor.

However, arms 10 could also be "straight", their middle lines then remaining substantially contained within the same transverse plane.

The number of arms 10 of each rotor is advantageously equal to eight and the total number of its fins 9 to sixteen or twenty-four.

It is the removal of the calories generated in the disc 2 by the creation of eddy currents during the utilization of the brake that the present invention proposes to improve.

Accordingly there are provided on at least certain ones of the surfaces internally bounding the ventilation channels 12 striae or constituted by parallel ribs which extend in directions inclined to the direction of circulation of the air in these channels.

These ribs have a slight height and are relatively separated from one another.

Thus:

the distance D separating two successive ribs (13 in FIG. 1) and reckoned in the direction of flow of the air streams in the channel 12 is comprised between 5 and 15 times the height H of each rib reckoned perpendicularly to the plane of the surface P, that is to say axially (see FIG. 2), and the height H is generally of the order of 2 to 5 mm.

Preferably the ratio D/H is of the order of 10 and the distance D, of the order of 30 to 40 mm.

The experience shows that such a measure improves to a notable extent the cooling of the disc whilst increasing only in a negligible proportion the torque necessary for the driving of the rotor due to the fact of a very slight increase in "losses by ventilation".

This improvement in cooling, that is to say in the heat exchange between the ventilation air and the rotor is due essentially to the following reasons:

the crests of the ribs break the boundary layers formed by the air currents along the metal surfaces to be cooled, the relative separation of these ribs enables the threads of air coming from the boundary layers thus broken to develop or become freely turbulent between these ribs and thus to sweep efficiently the metal surfaces comprised between the latter and to be mixed with the ajacent air streams, however, in view of their slight height, the ribs do not constitute an obstacle capable of impeding the ventilation air to the point of increasing to a non-negligible proportion the driving torque of the cold armature.

It is to be noted that the present improvement in cooling is hence due to an increase in the coefficient of heat exchange between the ventilation air and the armature and practically not to an increase in the exchange surfaces.

In the embodiment illustrated in FIGS. 1 and 2, it is the flat surface P of the disc 2 opposite the air gap E which is striated.

These striae are in the form of annular that are concentric to ribs 13 of axis X and project directly on said flat surface P.

The perpendicular cross-section of each rib forms here the shape of an isoceles triangle whose angle at the apex is a right angle or substantially such, the crest of each rib then being in the form of a sharp edge and sharpened in the manner of those of a prismatic balance knife.

In the modification shown in FIG. 3, the ribs concerned are again provided on the surface, of the disc 2, furthest from the air gap E, but these ribs are no longer defined here by sharp edges, but by concentric 14 of which the profile or cross-section in an axial plane has a sine or sinusoidal shape.

In another particularly advantageous modification, which has not been shown, the ribs have in cross-section a rectangular shape, the height of these ribs being advantageously a little greater than their width.

In the modification shown in FIG. 4, striae with sharp edges are again to be seen constituted by ribs 15 with a triangular profile of the type of the above ribs 13 but the disc 2 is no longer the only one to be striated: similar ribs 16 and 17 to the ribs 15 are to be found respectively on the surface, of the web 11, turned towards the disc 2 and on the lateral surfaces of the fins 9.

The ribs 16 provided on the web 11 are, like the ribs 15, annular and concentric around the axis X.

As for the ribs 17, their crests extend axially, that is to say in a direction perpendicular to the middle plane of the disc 2.

Some of these ribs 17 have been shown in mixed lines on FIG. 1.

In the embodiment shown in FIG. 4, the numbers of the ribs (15, 16, 17) provided respectively on the four surfaces bounding a same channel 12 are the same and their crests are extended each other by bounding together sorts of successive throttling diaphragms for the air in circulation in the channel concerned.

As a result of which, and whatever the embodiment adopted, there is provided finally an armature rotor for an electromagnetic brake whose constitution, operation and advantages (particularly improvement of the deceleration torque when hot) emerge sufficiently from the foregoing.

As is self-evident, and as results besides already from the foregoing, the invention is in no way limited to those of its types of application and embodiments which have been more especially envisaged; it encompasses thereof, on the contrary, all modifications, particularly:

those where the fins 9 would be hollowed by pockets opening into the open air through slots formed in the web 11, the bottoms of these pockets being constituted by the disc 2, and/or those where the fins 9 would be constituted by several sections offset from one another and radially straddling in part.

For all useful purposes, it is indicated that it has already been proposed to provide concentric ribs on the flat surface, of an armature disc of the type defined above, furthest from the air gap, but these ribs were in the form of gutters open towards the axis of the disc so as to constitute receptacles for a cooling liquid: hence it was not a question in any way of improving the coefficient of heat exchange between the disc and the ventilation air.

I claim:

1. Armature rotor for an electromagnetic brake that includes a stator, the rotor comprising at least one disc axially mountable spaced from the stator and connected to an inner fastening ring by a ring of arms, said arms being inclined to the corresponding radii so as to form ventilation fins, the disc having a first surface adjacent the stator and a substantially flat, second surface furthest therefrom, the portions of largest diameter of these arms projecting axially on the disc and their crests being joined together by an annular web, this web, the disc and those portions of the fins which connect the web and disc defining channels for ventilation air, characterized in that said second disc surface is striated or undulated by annular and concentric ribs extending in a direction inclined to the direction of flow of the air in these channels, the angle formed between side of a rib and the portion of the contiguous surface being at the most equal to 90°, and the ratio between the spacing (D) of successive ribs and the height (H) of these ribs being comprised between 5 and 15.

2. Rotor according to claim 1, wherein the ratio (D/H) is of the order of 10.

3. Rotor according to claim 1, wherein the height (H) of each rib is comprised between 2 and 5 mm.

4. Rotor according to claim 1, wherein the ribs are provided on the fins and extend in the axial direction.

5. Rotor according to claim 1, wherein the ribs are provided on the surface, of the web, situated on the side of the disc and are annular and concentric.

6. The rotor according to claim 1 wherein said annular, concentric ribs are continuous and are integral and unitary with said disc second surface.

* * * * *